TIME DIVISION TRANSHYBRID ECHO SUPPRESSOR

Filed May 26, 1964 3 Sheets-Sheet 1

INVENTOR
H. S. FEDER
BY Lucian C. Canepa
ATTORNEY

VOLTAGE
FIG. 3A CAPACITOR 21
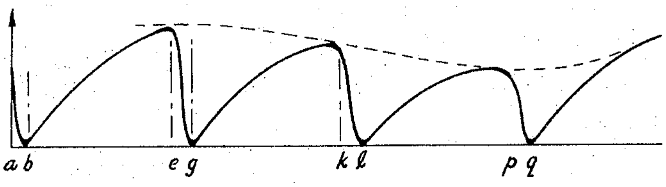
FIG. 3B CAPACITORS 53 & 90
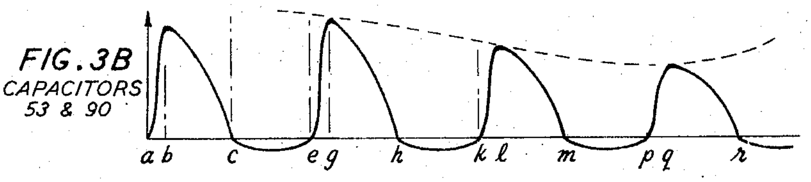
FIG. 3C INPUT TO DIFFERENTIATOR 60
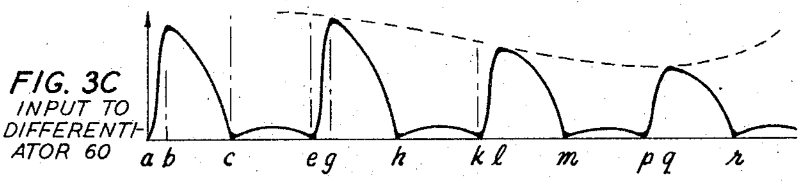
FIG. 3D OUTPUT OF DIFFERENTIATOR 60
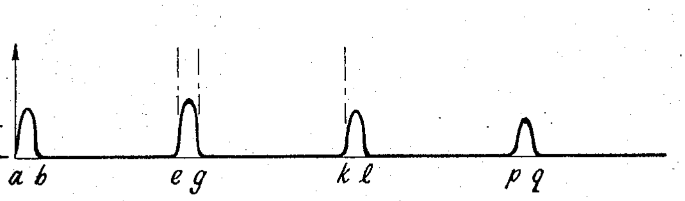
FIG. 3E OUTPUT OF MONOPULSER 65
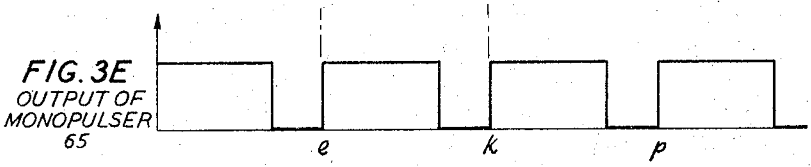
FIG. 3F AT SOURCE TERMINAL 31
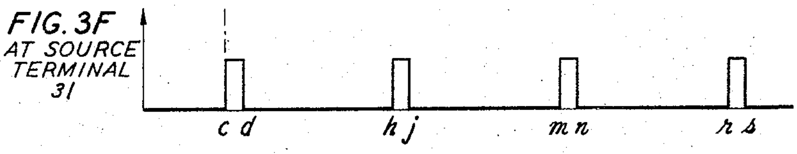
FIG. 3G AT SOURCE TERMINAL 32
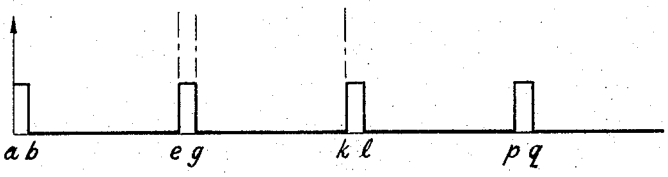
TIME →

VOLTAGE

CAPACITORS 53 & 90

CAPACITOR 26

CAPACITOR 21

OUTPUT OF DIFFERENTIATOR 60

SOURCE TERMINAL 31

SOURCE TERMINAL 32

3,366,738

TIME DIVISION TRANSHYBRID ECHO SUPPRESSOR

Herbert S. Feder, Matawan, N.J., assignor to Bell Telephone Laboratories, Incorporated, New York, N.Y., a corporation of New York Filed May 26, 1964, Ser. No. 370,325
17 Claims. (Cl. 179—15)

ABSTRACT OF THE DISCLOSURE

In a hybrid employed to convert between two-wire and four-wire signal transmission, time division switching principles are used to reduce the magnitude of the incoming signal reflected, as echo, into the transmission circuitry. A voice-operated switch further suppresses the echo signal by disabling a gate included in the transmission channel when an incoming signal is being received.

This invention relates to electrical transmission circuits and, more specifically, to a two-wire to four-wire transmission mode converter comprising a time division hybrid arrangement.

Present-day communications systems employ four-wire transmission networks in a plurality of system applications to provide a high grade signaling link. Such four-wire arrangements require a proper termination for the independent send and receive transmission paths included therein to accommodate a two-wire line circuit, which function is performed by various hybriding arrangements well known in the art.

Prior art hybrid embodiments typically comprise a plurality of inductively coupled transformer windings to provide a linkage between the two-wire and each of the four-wire ports. In addition, such hybrid circuits include a balancing network designed to match the external impedance connected to the two-wire port, wherein the transhybrid isolation between the send and receive four-wire ports is inversely proportional to the difference in impedance between the two-wire external impedance and the balancing network impedance. Since the impedance of a line circuit is a very complex function of line length and weather conditions, to mention only two variable factors, prior art hybrids are necessarily characterized by a relatively small attenuation between the send and receive ports.

Four-wire transmission systems inherently generate a spurious signal, commonly called echo, which results from a portion of the emitted energy being returned to the transmitting party via the transhybrid path of the receiving station. An excessive amount of echo has been found to be objectionable in a high quality communication link. Moreover, if the transhybrid attenuation decreases below a critical value, self-excited oscillations are induced in the network. Hence, echo and stability considerations often require hybrid arrangements with a relatively large signal attenuation between the send and receive four-wire ports.

It is thus an object of the present invention to provide an improved hybrid arrangement.

More specifically, an object of the present invention is the provision of a hybrid circuit characterized by a relatively high transhybrid attenuation.

It is another object of the present invention to provide a hybrid circuit which is relatively impervious to line impedance changes.

It is still another object of the present invention to provide a hybrid arrangement which may advantageously be electronically adjusted for a minimum of transhybrid conduction.

These and other objects of the present invention are realized in a specific illustrative hybrid arrangement which employs time division switching principles. The hybrid is a self-contained, general purpose circuit element which may be employed to convert between two-wire and four-wire transmission in any type of telephony system.

The two-wire hybrid port is connected via a lowpass filter to a common signal junction. The independent send and receive hybrid ports are respectively connected to the common junction by one of two series circuits each comprising an electronic line gate and a lowpass filter. A timing circuit is provided to alternately activate each gate for a short time interval, thereby alternately providing for a resonant transfer of information between the two-wire port and each of the independent send and receive ports.

By adjusting the filter included in the two-wire circuit portion to have an impulse response which is one-half the time duration of that characterizing the filters associated with the other hybrid terminals, extremely high isolation may be attained between the send and receive four-wire ports. Moreover, a voice-operated switch may advantageously be employed in the present arrangement to increase the transhybrid attenuation by disabling the four-wire sending port when incoming energy is detected at the receiving port.

It is thus a feature of the present invention that a hybrid arrangement include time division switching apparatus, and further comprise a voice-operated switch which is responsive to incoming signal energy at the four-wire hybrid receiving port for disabling the four-wire sending port.

It is another feature of the present invention that a time division hybrid include a common two-wire port and independent send and receive ports, a common junction point, a first lowpass filter connected between the two-wire port and the junction point, two circuit paths each comprising a gate and a serially-connected lowpass filter respectively connecting the send and receive ports with the junction point, wherein the filters included in the circuit paths are each characterized by an impulse response of twice the time duration of that characterizing the first lowpass filter.

A complete understanding of the present invention and of the above and other features, advantages and variations thereof, may be gained from a consideration of the following detailed description of an illustrative embodiment thereof presented hereinbelow in conjunction with the accompanying drawing, in which:

FIGS. 3A through 3G are a first set of timing diagrams illustrating the voltage waveforms associated with selected circuit elements illustrated in FIG. 2.

Figures 1, 2:
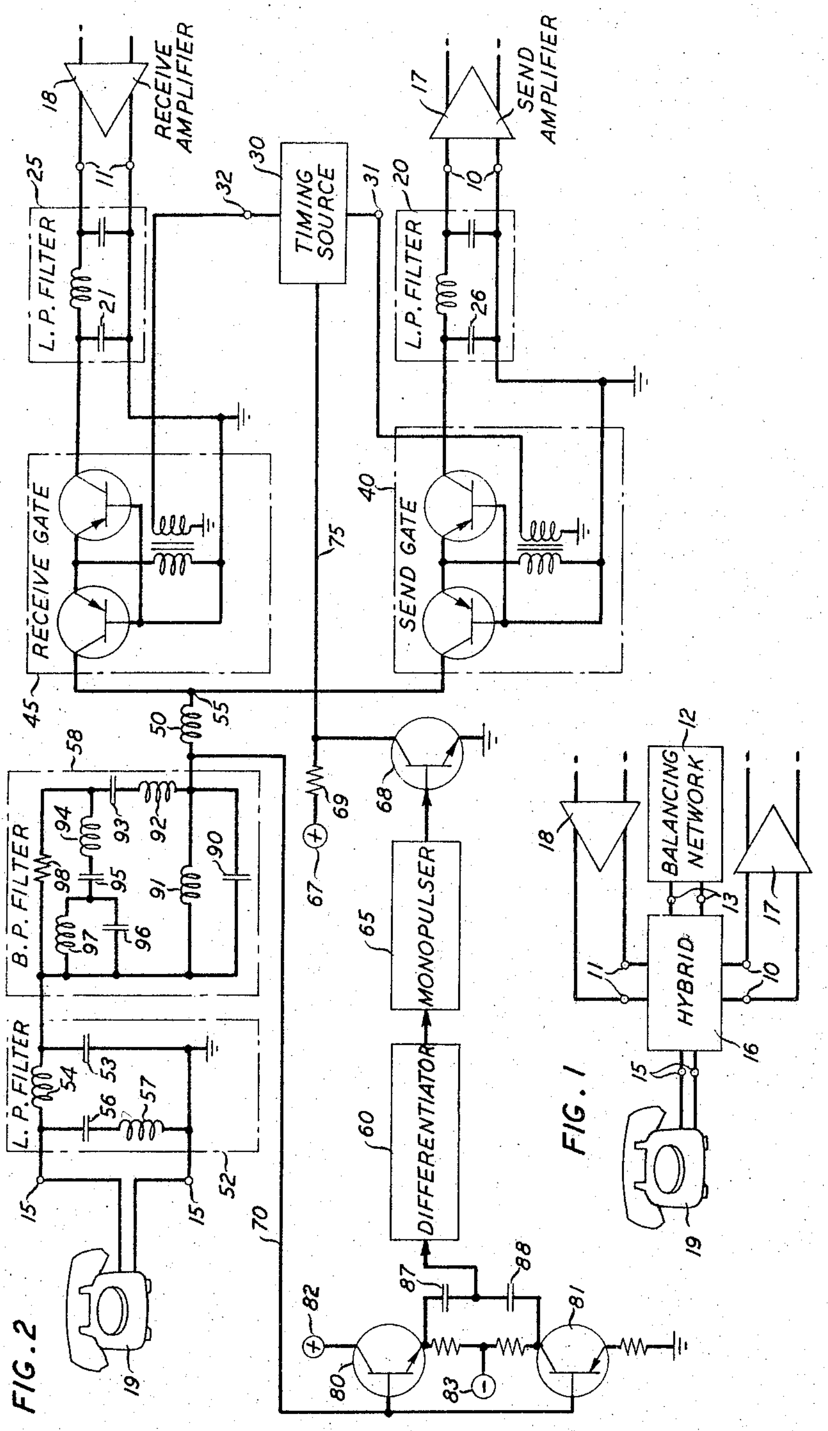
FIG. 1 is a block diagram illustrating a generalized hybrid arrangement.
FIG. 2 is a schematic diagram of a specific illustrative hybrid arrangement which embodies the principles of the present invention.

Referring now to FIG. 1, there is shown a generalized hybrid circuit 16 which provides a transmission linkage between a common two-wire port 15 and independent send and receive four-wire ports 10 and 11. The two-wire port 15 is connected to a line circuit which includes a telephone station set 19, while the send and receive ports 10 and 11 are respectively connected to the input and output nodes of two directional amplifiers 17 and 18. Finally, the hybrid 16 is further connected by way of an output port 13 to a balancing network 12. The hybrid arrangement 16 may advantageously comprise a plurality of inductively coupled transformer windings as disclosed, for example, in D. B. James et al. Patent 2,936,338, issued May 10, 1960.

The hybrid 16 essentially functions as a bridge network in gating energy received at the incoming port 11 to the station set 19 via the two-wire port 15. In addition, the hydrid 16 steers energy supplied by the set 19 to the port 15 to the sending port 10, and thereby also to the sending amplifiers 17. In general, hydrid embodiments also direct a portion of the energy supplied from the set 19 to the common two-wire port 15 to the receiving port 11. However, this energy is blocked by the directional amplifier 18, and is dissipated in the output impedance thereof.

A commonly used figure of merit for a hydrid arrangement is its transhybrid attenuation, i.e., the reduction in amplitude of a single which is supplied to the receiving port 11, as it appears at the sending port 10. An ideal hybrid element would, of course, have perfect isolation between the send and receive ports 10 and 11. As discussed hereinabove, if an appreciable amount of signal energy is transmitted between the ports 10 and 11, oscillations and/or echo may result. The transhybrid attenuation T.A. in decibels (db) between the ports 10 and 11 is given by $$\text{T.A.}=20\log\left|\frac{Z_0+Z_b}{Z_0-Z_b}\right|+6 \quad (1)$$

where $Z_0$ and $Z_b$ respectively comprise the external impedances connected to the two-wire port 15 and the balancing port 13. Thus, examining Equation 1, it is observed that the transhybrid attenuation increases as the impedances $Z_0$ and $Z_b$ approach a match. However, as heretofore mentioned, the impedance of the line circuit connected tot he common port 15 is a very complex function which depends upon a great many factor, many of which cannot be closely regulated. Thus, it is extremely difficult to design a balancing network 12 which is a good replica of the impedance of the line circuit. Hence, most prior art hydrid arrangements are typically characterized by transhybrid attenuations of less than about 20 db.

Referring now to FIG. 2, there is shown an illustrative time division hybrid embodiment constructed according to the principles of the present invention for producing a relatively high transhybrid attenuation. The arrangement, in correspondence with FIG. 1, includes a common two-wire port 15 and independent send and receive four-wire ports 10 and 11 which are respectively connected to a station set 19, and to directional amplifiers 17 and 18. The two-wire port 15 is connected via a lowpass filter 52, a bandpass filter 58 and a resonant transfer inductance 50 to a common junction point 55. Similarly, the sending port 10 and the receiving port 11 are each connected through a lowpass filter 20 or 25 and an electronic gate 40 or 45, respectively, to the junction point 55.

The lowpass filters 20, 25 and 52 each basically comprise a single pi section including shunt capacitors and a series inductance, while the bandpass filter 58 essentially includes a parallel resonant circuit comprising the elements 91 and 90. The remaining circuit elements are included in the filters 52 and 58 to produce sharper attenuation characteristics at the edges of the filter conduction bands.

An embodiment satisfying the requirements of the gates 40 and 45 for producing a zero or infinite impedance to current flow in either direction is shown in J. D. Johannesen et al. 2,899,570, issued Aug. 11, 1959. Briefly, the arrangement comprises a pair of transistors having common bases and common emitters, with the secondary winding of a pluse transformer being connected between the base and emitter of each transistor. Each gate is enabled by the application of an electrical pulse to the corresponding transformer primary winding.

During the intervals of circuit operation when information is being transmitted from the station set 19 to the sending port 10, there is a resonant transfer of information through the inductance 50 from the output capacitors 53 and 90 included in the composite two-wire port filter arrangements to the capacitor 26 included in the filter 20. Similarly, when information is flowing from the receiving input port 11 to the common port 15, there is a resonant transfer of information via the resonant transfer inductance 50 from the capacitor 21 included in the filter 25 to the capacitors 53 and 90. Correspondingly, when information is flowing between the ports 11 and 15, the receiving gate 45 is enabled, while the gate 40 is in a conducting state when information is transmitted between the ports 15 and 10. The employment of capacitors, inductors, and line gates to effect a resonant transfer of information is more fully discussed hereinafter, and is described in detail in W. D. Lewis Patent 2,936,337, issued May 10, 1960.

A timing source 30 is included in the FIG. 2 arrangement and connected via two output terminals 31 and 32 to the send and receive gates 40 and 45, respectively. The source 30 is adapted to alternately provide voltage pulses of a relatively narrow time duration to the gates 40 and 45. The precise duration of these pulses is designed to correspond to the resonant transfer period defined by the resonant transfer inductor 50, the capacitors 53 and 90, and one of the capacitors 21 and 26 which are advantageously of a like value. The timing source 30 may illustratively comprise any of the well-known free running or synchronized bistable elements, such as a multivibrator, along with timing circuits, such as differentiators, to limit the width of the output pulses supplied to the output terminals 31 and 32.

As will be discussed hereinafter, the aforementioned structure is sufficient to accomplish the hybriding function, and to provide a high degree of transhybrid attenuation. However, by adding thereto the following structure which comprises a voice-operated switch, the isolation between the send and receive ports may be still further increased. The voice-operated switch comprises two serially-connected transistors 80 and 81 of opposite conductivity types which are biased by a positive potential source 82 and a negative potential source 83. Two capacitors 87 and 88 respectively connect the emitter and collector of the transistors 80 and 81 to the input of a differentiating circuit 60. A monopulser 65 responds to positive pulses supplied thereto by the differentiator 60 by supplying positive pulses to the base of a normally nonconducting transistor 68, with the collector of the transistor 68 being connected by a resistor 69 to a positive potential source 67. The duration of the pulses supplied by the monopulser will be described hereinafter. It is noted that the monopulser 65 is adapted to be unresponsive to negative pulses supplied thereto by the differentiator 60.

The base terminals of the transistors 80 and 81 are each connected by a lead 70 to the resonant transferring capacitors 53 and 90 respectively included in the lowpass filter 52 and the bandpass filter 58. The collector of the transistor 68, which comprises the output terminal of the composite voice-operated switch, is connected to the timing source 30. When the output of the monopulser 65 is de-energized the transistor 68 is nonconductive, and a relatively high potential is supplied to the lead 75 thereby allowing the timing source 30 to function as described above. However, when the monopulser 65 supplies a signal to the base of the transistor 68, the transistor becomes saturated, and an effective ground potential is applied to the lead 75. Under this circuit condition, the lead 75 inhibits the timing source 30 from supplying the next recurring pulse to the output terminal 31.

The lowpass filters 20, 25, and 52 are each adapted to have a like upper cut-off frequency $f$, while the bandpass filter 58 is designed to pass frequencies in the band between $f$ and $2f$. Correspondingly, the lowpass filters 20 and 25 are characterized by an impulse response which runs down to zero volts in a time $1/2f$. That is, if any initial voltage is supplied to filter capacitors 21 or 26, the potential thereacross will attain a value of zero $1/2f$ seconds later. However, because of its unique organization, the combination of the lowpass filter 52 and the series-connected bandpass filter 58 have an impulse response which runs down to zero in a time $1/4f$. In addition, the timing source 30 is adapted to supply pulses to each of the gates 40 and 45 every $1/2f$ seconds in a staggered, alternating fashion. As will be seen hereinafter, the instant hybrid arrangement employs the aforementioned relative properties of the timing source 30 and the filtering embodiments.

With the above organization in mind, an illustrative sequence of circuit operation for the FIG. 2 hybrid arrangement will now be discussed. The operation of the instant invention may best be observed by temporarily ignoring the leads 70 and 75, along with the voice-operated switching elements connected therebetween. It wi.l now be shown that the FIG. 2 arrangement provides all the required hybrid functions, viz., transmitting information between the ports 11 and 15, and 15 and 10, and, moreover, accomplishing such transmission while coincidentally providing relatively high transhybrid attenuation.

First, assume that incoming information is being supplied by the receiving amplifier 18 to the receiving port 11, and that the receiving gate 45 has just been disabled by the termination of a voltage pulse supplied thereto by the timing source 30, as shown for the time *b* in FIGS. 3A and 3G. Under such initialized conditions, the filter capacitor 21 has no voltage thereacross. Responsive to the incoming analog signal (shown dashed in FIGS. 3A, 3B and 3C) the lowpass filter 25, and thereby also the output filter capacitor 21 charge up towards the value of the input signal, as illustrated in FIG. 3A for the interval between the times *b* and *e*.

At the time *e* in FIG. 3G, the timing source 30 next supplies a pulse to the output terminal 32 thereon, and thereby also to the receiving gate 45 which is hence rendered conductive. Under these conditions, a resonant transfer path is completed from the capacitor 21 via the receiving gate 45 and the resonant transfer inductance 50 to the two-wire port resonant transfer capacitors 53 and 90. Thus, in accordance with the principles disclosed in the aforementioned Lewis patent, a resonant transfer of information between the filter capacitor 21 and the capacitors 53 and 90 occurs in the time interval *e–g* illustrated in FIGS. 3A, 3B and 3G. That is, the voltage which existed on the capacitor 21 just prior to the time *e* is interchanged with the voltage stored in the capacitors 53 and 90 at this time. Since in the case presently under consideration the capacitors 53 and 90 were initially uncharged, the capacitor 21 is reset at time *g* to a zero potential condition, as indicated in FIG. 3A, while the capacitors 53 and 90 attain a total potential equal to the analog voltage which existed across the capacitor 21 at time *e*. Following the time *g*, the capacitor 21 again charges towards the instantaneous analog potential which is being supplied to the input port 11, as seen in the interval between the times *g* and *k* in FIG. 3A. During this interval, the potential across the capacitors 53 and 90 associated with the two-wire port is decreasing, as the received information is being transmitted by the filters 52 and 58 to the station set 19.

As hereinabove discussed, the impulse response of the composite filtering embodiment associated with the two-wire port 15 is designed to have an impulse response which runs down to zero in one-half the period between which the receiving gate 45 is sequentially energized. That is, the information stored in the filter capacitors 53 and 90 at time *g* is sent via a line circuit to the station set 19, and the filter capacitors 53 and 90 have zero potential thereacross at the mid-point of the interval (time *h*) between the two successive pulses supplied by the timing source 30 to the output terminal 32 at times *e* and *k*. As may be observed from FIGS. 3A, 3B and 3G, the aforementioned wave shapes recur as long as information is being received at the hybrid four-wire receiving port 11.

Note now, that the timing source 30 supplies a series of pulses to the output terminal 31, which pulses begin at the times *c, h, m* and *r* shown in FIG. 3F, and that these pulses occur at the mid-point of the intervals between consecutive pulses supplied to the source output terminal 32. Responsive to each energization supplied to the source output terminal 31, the sending gate 40 is rendered conductive, and a resonant transfer path is enabled between the filter capacitors 53 and 90, and 26, via the resonant transfer inductor 50. However, by examining FIGS. 3B and 3F, note that the potential across the capacitors 53 and 90 is approximately zero during the intervals when the gate 40 is enabled, and thus no voltage is supplied to the sending port 10 during these periods. Hence, there is relatively high isolation between the receiving port 11 and the sending port 10, since no information supplied from the receiving port 11 to the port 15 is permitted to reach the sending port 10.

Figure 4A:
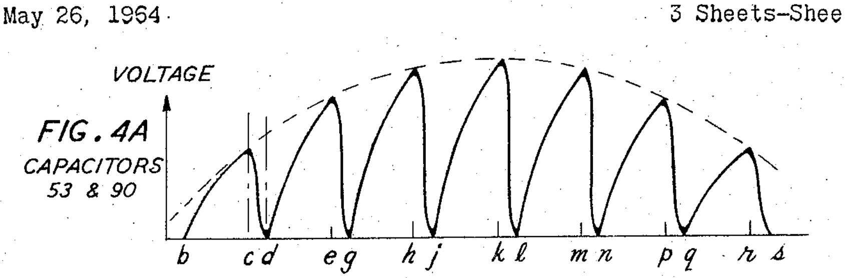
FIGS. 4A through 4F are a second set of timing diagrams illustrating the voltage waveforms associated with selected circuit elements illustrated in FIG. 2.
Figure 4B:
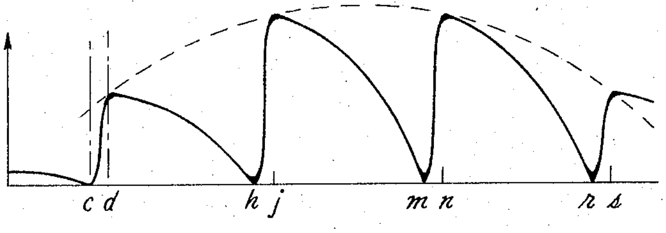
Figure 4C:
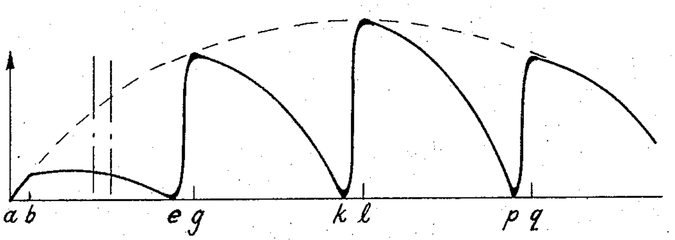

To satisfy each of the hybrid requirements, it remains only to be shown that signal energy may be transferred in the opposite direction, i.e., from the station set 19 to the send port 10, in order to provide bilateral communication. When information (indicated by dashed lines in the FIG. 4 curves), is supplied by the station set 19 to the filters 52 and 58, the filter capacitors 53 and 90 increase in potential, as shown in FIG. 4A, for example, for the interval between times *b* and *c*. Each time the send gate 40 is enabled, viz., at times *c, h, m* and *r* shown in FIGS. 4B and 4E, a resonant transfer path is established between the capacitors 53 and 90, and 26, thereby communicating information from the port 15 to the port 10. However, note that at the times *e, k* and *p* illustrated in FIGS. 4A, 4C and 4F, there is a corresponding resonant transfer of information between the capacitors 53 and 90, and the filter capacitor 21 associated with the receiving hybrid four-wire port 11. Hence, as much energy is transmitted from the station set 19 to the receiving port 11, as is communicated from the set 19 to the desired, transmitting port 10. However, this is precisely the situation described above for conventional, prior art hybrids. In further correspondence with prior art hybrid arrangements, the spurious signal energy supplied by the set 19 to the receiving port 10 is simply dissipated in the output impedance of the receiving amplifier 18.

Thus, the above discussion illustrates that the FIG. 2 arrangement is capable of providing a communications link between the receiving node 11 and the station set 19, and also of supplying a path to the outgoing node 10 for signals originating at the set 19. Moreover, when information is being received at the incoming port 11, the FIG. 2 hybrid was shown to provide a relatively high transhybrid isolation between the ports 10 and 11 by energizing the sending gate 40 at times during which the two-wire filter capacitors 53 and 90 have no voltage stored therein. Moreover, it is noted that the pulses supplied to the gate 40 may be electronically adjusted to occur precisely at the times when the capacitors 53 and 90 are without charge, thereby to provide maximum isolation between ports 10 and 11. The FIG. 2 hybrid, without the voice-operated switching structure, has been operated with a transhybrid attenuation greater than 30 db.

Attention will now be directed to the voice-operated switching feature of the present invention. In over-all terms, the switch is adapted to respond to a flow of information from the input port 11 towards the two-wire line circuit by totally disabling the sending channel associated with the port 10. It is apparent that such a circuit operation functions to increase the transhybrid attenuation.

Referring now to FIG. 3B, it may be observed that each time information is transmitted from the filter capacitor 21 to the capacitors 53 and 90, there is a corresponding relatively steep rise in the magnitude of the potential across the capacitors 53 and 90. This potential transient occurs in the intervals *a–b, e–g, k–l* and *p–q* shown in FIG. 3B. As disclosed hereinbelow, the voice-operated switch makes use of the above-described voltage waveshape.

The potential across the filter capacitors 53 and 90 is coupled by the switch input lead 70 to the base terminals of the transistors 80 and 81. A positive input potential is amplified without phase inversion by the transistor 80, with the amplified signal being coupled by the capacitor 87 to the input of the differentiator 60. When the potential applied by the input lead 70 is negative, the signal is amplified and inverted by the transistor 81, and transmitted as a positive signal by the capacitor 88 to the input of the differentiator 60. The transistors 80 and 81 thus provide both full wave rectification and amplification. The composite potential supplied to the input of differentiator 60 is shown in FIG. 3C, with this wave shape being similar to the voltage across the filter capacitors 53 and 90 (shown in FIG. 3B), except that the negative wave shape portions are inverted.

The differentiator 60 is adapted to respond only to the relatively rapidly changing portions of the input wave supplied thereto. Accordingly, the differentiator 60 generates the positive pulses shown in FIG. 3D which begin at the times *a, e, k* and *p* corresponding to the times when energy is being supplied to the capacitors 53 and 90. When the pulses shown in FIG. 3D are received at the input of the monopulser 65, this circuit combination supplies voltage pulses (shown in FIG. 3E) which saturate the transistor 68. The width of the pulses supplied by the monopulser 65 is designed to be greater than one-half, and less than the full time interval between consecutive pulses supplied by the timing source 30 to the sending gate 40. The saturated transistor 68 effectively supplies a ground potential through the output lead 75, to the timing source 30. By any means commonly known to one skilled in the art, the timing source 30 is adapted to respond to this ground potential by suppressing the next scheduled pulse which was to be supplied to the gate 40 via the output terminal 31.

Since no pulse is supplied from the output terminal 31 to the sending gate 40, this gate is not enabled while information is being received at the input port 10. Thus, any spurious potential which may exist across the capacitors 53 and 90 is not supplied to the output four-wire port 10 during the times when this port would otherwise be enabled. Hence an extremely high degree of isolation is obtained between the four-wire ports 10 and 11. By way of illustration, the FIG. 2 arrangement has attained a transhybrid attenuation greater than 40 db when the voice-operated switch is employed therein.

The above discussion has demonstrated that the voice-operated switch responds to information flowing from the port 11 towards the port 15 by disabling the sending gate 40. In addition, it will now be shown that the voice-operated switch is properly inoperative when information is being supplied from the set 19 to the two-wire port 15.

Figure 4D:
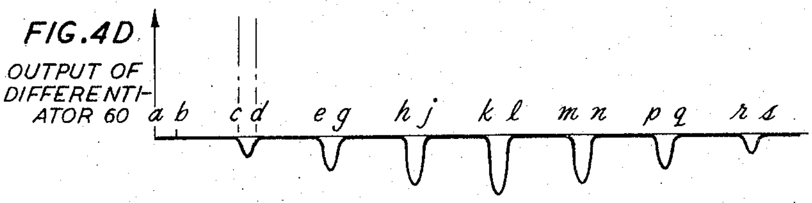
Figure 4E:
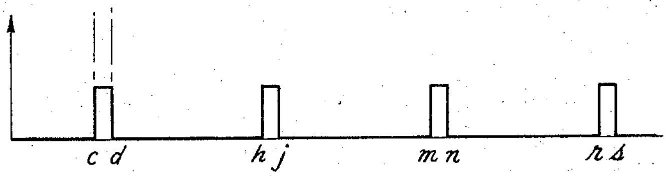
Figure 4F:
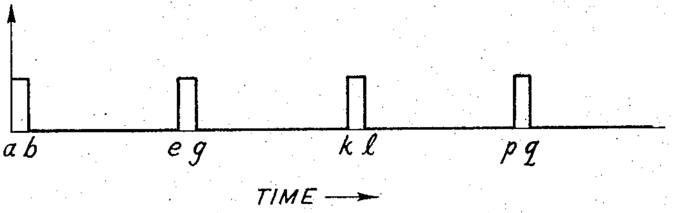

The voltage wave form associated with the capacitors 53 and 90 when energy is being supplied to the port 15 by the set 19 is illustrated in FIG. 4A. This waveform is propagated without change through the transistor 80 and the capacitor 87 to the differentiator 60. The differentiator 60 response to the relatively rapid signal delay occurring at the times *c, e, h, k, m, p* and *r* shown in FIG. 4A by generating a corresponding train of negative pulses, as illustrated in FIG. 4D. However, the monopulser 65 is adapted to respond solely to positive pulses, and is hence unaffected by these output pulses from the circuit 60. Thus, the voice-operated switch properly does not suppress any pulses generated by the timing source 30 when signal energy flows from the port 15 to the sending port 10.

Voice-responsive switches have heretofore been employed in echo suppressor embodiments to totally disable either a send or receive four-wire transmission channel when energy was being transmitted on the other path.

However, in such arrangements, the suppression has been complete to the extent that no communication at all is possible by the party whose outgoing link has been severed. Thus, once a party has surrendered control of the transmission facilities, he retains no way to communicate a desire to interrupt. However, in the instant arrangement, note that transmission between station set 19 and send amplifier 17 is only disabled when information is being detected at the receiving node 11. Since the received signals are of the alternating-current variety, the amplitude thereof passes to zero several thousand times a second. During these intervals, no signal transients are impressed across the filter capacitors 53 and 90 and, correspondingly, the voice-operated switch does not disable the next scheduled closure of the sending gate 40. Thus, many times each second the send gate 40 is enabled to conduct energy between the set 19 and the sending port 10 in order that the party at the two-wire port 15 may notify the remote party that he desires to interrupt.

Summarizing the basic concepts of an illustrative embodiment of the present invention, a hybrid arrangement made in accordance therewith advantageously employs time division switching principles. The hybrid is a self-contained, general purpose circuit element which may be employed to convert between two-wire and four-wire transmission in any type of telephony system.

The two-wire hybrid port is connected via a low-pass filter to a common signal junction. The independent send and receive hybrid ports are respectively connected to the common junction by two series circuits each comprising an electronic line gate and a lowpass filter. A timing circuit is provided to alternately activate each gate for a short time interval, thereby alternately providing for a resonant transfer of information between the two-wire port and each of the independent send and receive ports.

By adjusting the filter included in the two-wire circuit portion to have an impulse response which is one-half the time duration of that characterizing the filters associated with the other hybrid terminals, extremely high isolation may be attained between the send and receive four-wire ports. Moreover, a voice-operated switch may advantageously be employed in the present arrangement to increase the transhybrid attenuation by disabling the four-wire sending port when incoming energy is detected on the receiving port.

To more readily facilitate the practice of the instant invention, the values of selected circuit elements are given in Table I, infra. These component values correspond to a timing source 30 which is supplying pulses at an 8 kilocycle rate with a pulse width of two microseconds.

TABLE I

| Element: | | Value |
|---|---|---|
| 50 | microhenrys | 52.5 |
| 54 | millihenrys | 135 |
| 57 | do | 96 |
| 91 | do | 33 |
| 92 | do | 105 |
| 94 | do | 74.5 |
| 97 | do | 136 |
| 53 | farads | .035 |
| 56 | do | .0135 |
| 90 | do | .028 |
| 93 | do | .00859 |
| 95 | do | .0122 |
| 96 | do | .00666 |
| 98 | kilohms | 2 |

It is to be understood that the above-described arrangement is only illustrative of the application of the principles of the present invention. Numerous other arrangements may be devised by those skilled in the art without departing from the spirit and scope of the invention.

For example, the FIG. 2 arrangement includes one receiving port 11 and one sending port 10, thereby allowing the set 19 to transmit information to only one party. However, any number *n* of four-wire ports may be included in the instant embodiment to permit the station set 19 to comunicate with *n* remote stations. Such a system would simply require that the composite filter associated with the two-wire port 15 be characterized by an impulse response which runs down to zero volts in $1/n$ the run-down time characterizing the lowpass filters associated with the *n* remote stations.

What is claimed is:

1. A time division hybrid comprising a common two-wire port and independent send and receive ports, a common junction point, a first lowpass filter and a series-connected resonant transfer inductor connected between said two-wire port and said junction point, first and second circuit means each comprising a gate and a series-connected lowpass filter respectively connecting said junction point with said send and receive ports, said filters included in said first and second circuit means being characterized by an impulse response of twice the time duration of that characterizing said first lowpass filter, and means for alternately activating said gates included in said two circuit means.

2. A combination as in claim 1 further comprising voice-operated switching means including an input terminal and an output terminal, means connecting said input terminal to said first lowpass filter and said output terminal to said gate activating means, said voice-operated switch responding to the flow of energy from said four-wire receiving port to said two-wire common port for suppressing the activation next scheduled to be supplied by said gate activating means to said gate associated with said four-wire sending port.

3. A combination as in claim 2 wherein said voice-operated switch comprises bipolar amplifying and full wave rectifying means, a differentiating arrangement, a monopulser and a transistor switch serially connected in that order between said input and output terminals.

4. A hybrid arrangement comprising a common two-wire port and independent send and receive four-wire ports, a common junction point, a first filter and a series-connected resonant transfer inductor joining said two-wire port with said junction point, first and second circuit means each comprising a gate and a series-connected lowpass filter respectively connecting said junction point with said send and receive ports, said first filter comprising the interconnection of a lowpass filter and a bandpass filter.

5. A combination as in claim 4 wherein said lowpass and bandpass filters included in said first filter are respectively characterized by a like upper and lower cutoff frequency.

6. A combination as in claim 5 further comprising timing means for alternately activating said gates included in said series circuits.

7. A combination as in claim 6 further comprising voice-operated switching means including an input terminal connected to said first lowpass filter and an output terminal connected to said timing means, said voice-operated switch being responsive to relatively fast transient signals of a pre-selected polarity for inhibiting said timing means from supplying the next recurring pulse to said gate associated with said four-wire send port.

8. A combination as in claim 7, wherein said voice-operated switching means comprises two series-connected transistors of opposite conductivity types, a differentiator, a capactive coupling from each of said transistors to said differentiator, a transistor switch, and a monopulser having an input and output thereon respectively connected to said differentiator and to said transistor switch.

9. A combination as in claim 8 wherein said hybrid arrangement further comprises a line circuit connected to said two-wire common port, and oppositely poled directional amplifying means connected to said independent four-wire send and receive ports.

10. A hybrid arrangement comprising a common two-wire port and independent send and receive ports, first and second conduction paths respectively connecting said send and receive ports with said two-wire common port, first gating means serially included in said first conduction path, means for periodically detecting the instantaneous signal level across said independent receiving port, and switching means responsive to said instantaneous signal level detecting means for disabling said first gating means for a predetermined period of time.

11. A combination as in claim 10 wherein said hybrid arrangement comprises a first lowpass filter connected between said two-wire port and said first and second conduction paths, said first conduction path comprising said first gating means and a series-connected lowpass filter, said second conduction path comprising second gating means and a series-connected lowpass filter, said lowpass filters included in said first and second conduction paths being characterized by an impulse responsive of twice the duration of that characterizing said first lowpass filter.

12. A combination as in claim 11 further comprising a resonant transfer inductor connected between said first lowpass filter and said first and second conduction paths.

13. The combination as in claim 12 further comprising timing means for alternately activating said first and second gating means.

14. The combination as in claim 13 further comprising oppositely poled directional amplifying means connected to said independent send and receive hybrid ports, and a line circuit connected to said two-wire port.

15. The combination as in claim 10 wherein said switching means includes the series connection of full wave rectifying means, a differentiator, a monopulser, and a transistor switch.

16. In combination in a time division hybriding arrangement, a common two-wire port, *n* independent four-wire ports, where *n* is any positive integer greater than one, a common junction point, a first filter and a series-connected resonant transfer inductor connected between said two-wire port and said junction point, *n* circuit means each comprising a gate and a series-connected lowpass filter respectively connecting said junction point with each of said *n* independent ports, said first filter being characterized by an impulse response of $1/n$ the time duration of that characterizing each of said lowpass filters included in said *n* circuit means.

17. A combination as in claim 16 further comprising a recycling timing source for sequentially enabling each of said gates included in said *n* circuit means.

References Cited

UNITED STATES PATENTS

| | | | |
|---|---|---|---|
| 3,267,218 | 8/1966 | Adelaar | 179—15 |
| 3,215,789 | 11/1965 | Hunter et al. | 179—170.6 |
| 2,702,319 | 2/1955 | Ryall | 179—170.6 |

ROBERT L. GRIFFIN, *Primary Examiner.*